F. P. MANSBENDEL.
FERTILIZER MACHINERY.
APPLICATION FILED JUNE 2, 1914.
1,193,581.
Patented Aug. 8, 1916.
4 SHEETS—SHEET 1.
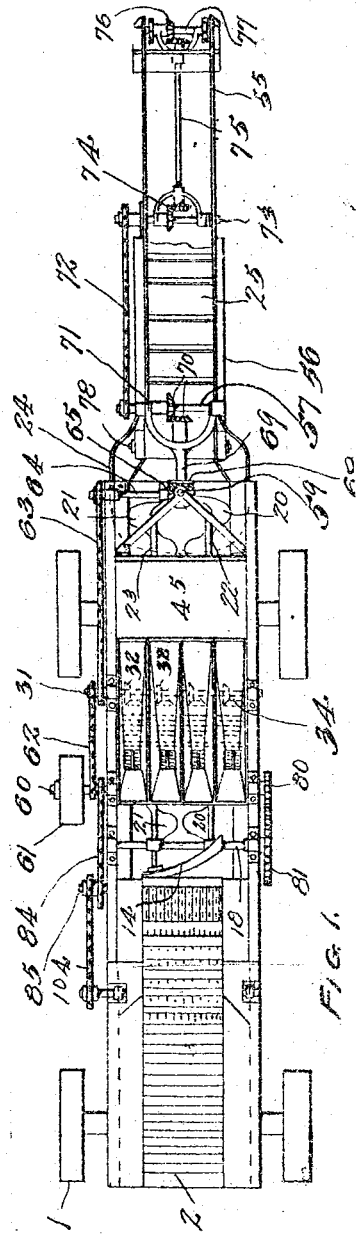
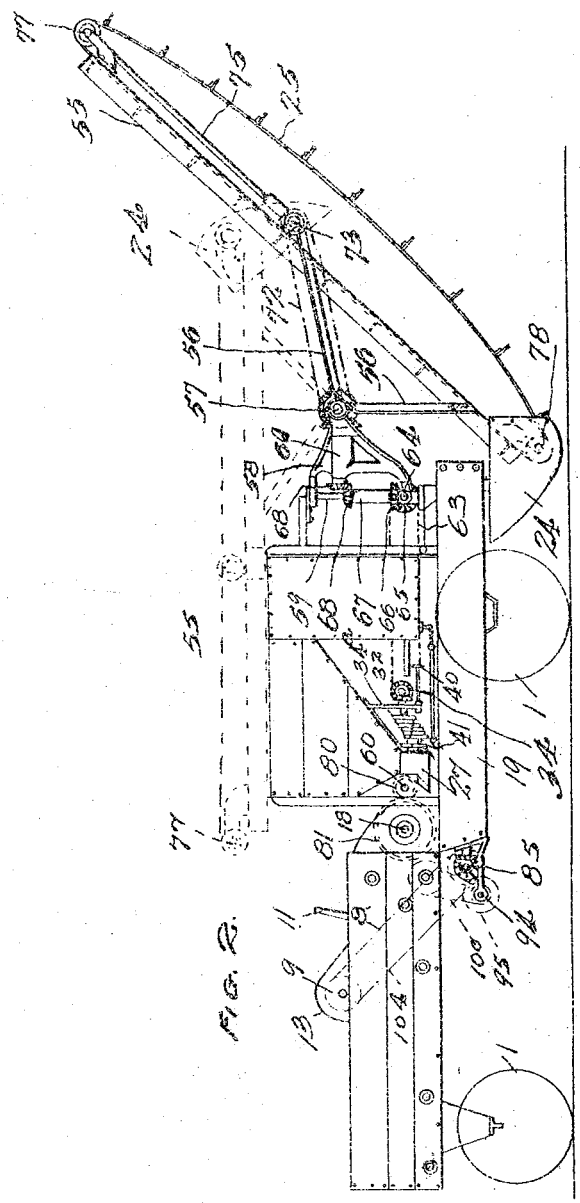

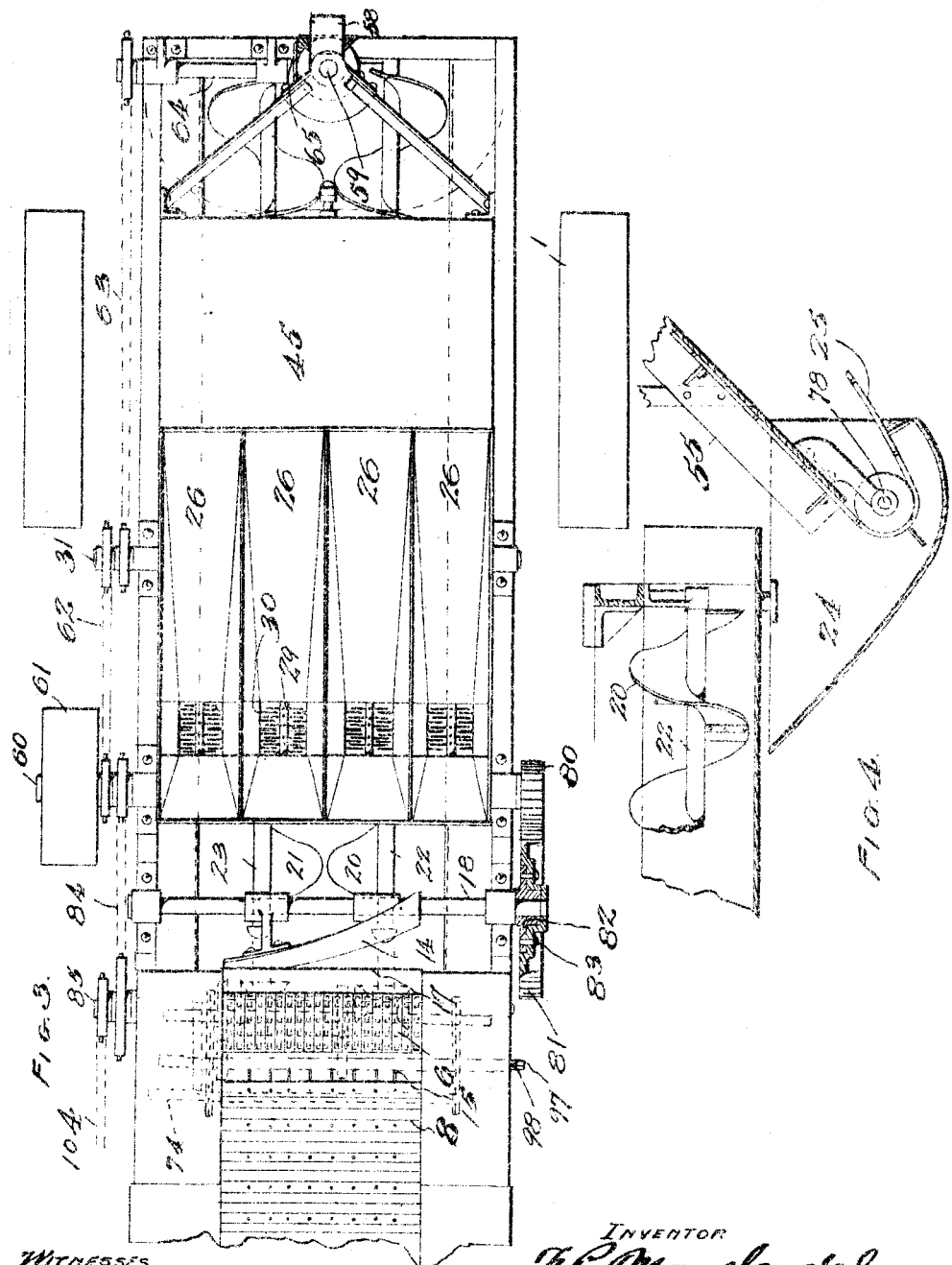

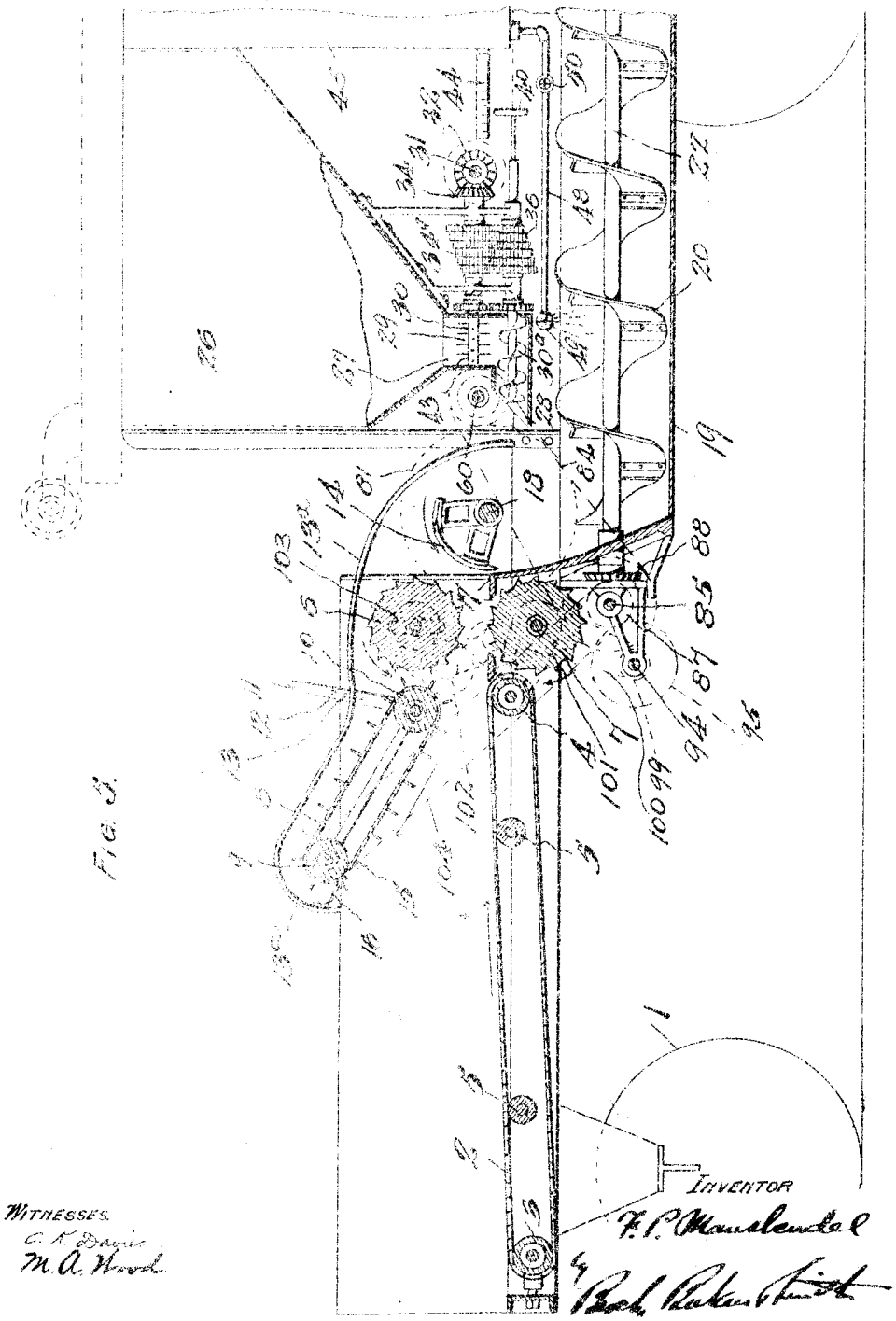

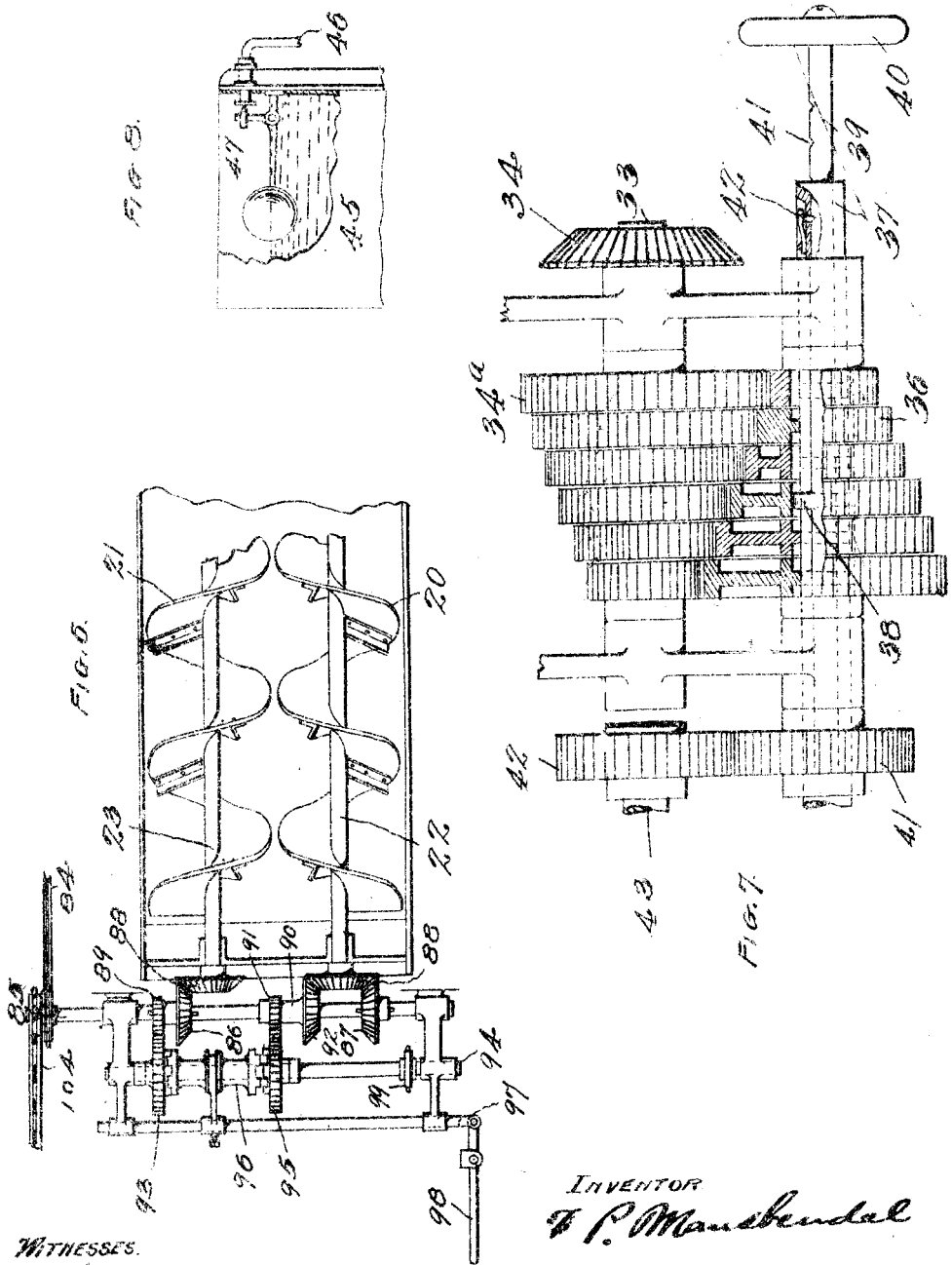

UNITED STATES PATENT OFFICE.

FRITZ P. MANSBENDEL, OF NEW YORK, N. Y., ASSIGNOR, BY MESNE ASSIGNMENTS, TO THE STANDARD SOIL FERTILITY COMPANY OF AMERICA, INCORPORATED, A CORPORATION OF NEW YORK.

FERTILIZER MACHINERY.

1,193,581.

Specification of Letters Patent.   Patented Aug. 8, 1916.

Application filed June 2, 1914.   Serial No. 842,413.

*To all whom it may concern:*

Be it known that I, FRITZ P. MANSBENDEL, a subject of the Emperor of Germany, residing at New York city, State of New York, United States of America, have invented certain new and useful Improvements in Fertilizer Machinery, of which the following is a specification.

My invention relates to a machine intended for the manufacture of fertilizer from any suitable body material, using refuse, such as straw, tomato and potato vines, plowed up clover and alfalfa roots, moss, leaves, manure, spent hops, peat, cornstalks, cotton waste, or any similar material. Its main functions are:—First, to cut, separate, and fine this body material and to reduce it to a consistency allowing of easy mixing; second, to automatically add to it in fine powdered form, singly or in combination, the several ingredients, *i. e.*, nitrate of soda, acid phosphate and muriate of potash, or any additional material like innoculation dirt, antiseptics and insecticides, lime, or gypsum, in certain fixed and definite proportions; third, to thoroughly mix these ingredients with the body while water is being added as required; and fourth, to deliver the finished product, thoroughly mixed and moistened, by means of a conveyer, ready to be dumped into cars or in piles on the ground.

The cutting of the material and its separation are an absolute necessity in the preparation of fertilizer according to this process, for every part of the material should be in such a loose state that it can be brought into intimate contact with all the chemicals. The cutting also effectively prevents the long straw, which is always present in some of the body materials, like manure, from becoming entangled in the mixing mechanism, thereby greatly retarding and hindering the operation of the machine. Likewise, when being distributed over the ground, the short, cut material will spread more evenly and not drag under the harrow, pushing earth and seed along with it.

In an older process, only well rotted and composted manure could be used as a body, and a portion of the chemicals, such as muriate of potash and nitrate of soda, was added in the form of a watery solution. In order to fabricate fertilizer having a fixed percentage of available nitrogen, phosphoric acid and potash, or equivalent fertilizing agents, a definite quantity of the watery solution of nitrate of soda and muriate of potash, together with a separate and definite quantity of dry acid phosphate had to be added to the compost regardless of its condition, and in case the body was already wet and saturated.

While the proportion of added dry or pulverized ingredient or ingredients may be definite as above described in any stated adjustment of the machine, means are also provided for varying the rate of delivery of such ingredients so that the added materials may be suitably proportioned to each other and to the body material; but when each delivery device is once adjusted it will maintain the fixed proportion as above.

Inasmuch as all the mechanisms of this new machine may be driven from one main shaft, the relation between the amount of body material and the amount of chemicals added to it will remain the same regardless of the speed at which the machine is operated.

Mechanism for carrying out the above described objects, and its principles of operation may be generally described as follows: A traveling conveyer, upon which the body material, like manure, peat, etc. to be worked, is loaded, carries this material to a cutting mechanism which is similar to the machines used for cutting ensilage and cattle feed. This cutter is arranged to separate the material and to cut it in lengths (in one specific embodiment) of approximately 4", after which it drops into a trough provided with two mixing and conveying screws rotating in opposite directions. While the material is being mixed and conveyed in this trough, the several chemicals are added by means of a feeding mechanism located immediately above the trough and close to the cutter. This mechanism consists of several hoppers or reservoirs placed side by side and provided at the bottom with a screw feeding attachment which is made to revolve at a predetermined rate of speed and in such a manner that it will positively deliver a fixed quantity of each chemical into the trough. After the chemicals have been added to the body material and while this is being thoroughly mixed in the trough, a fine spray of water is sprinkled over the material in order to give the whole mass the proper amount of moisture; that is to say, if the manure or other body material to be worked is already moist, the quantity of water added will be less than if the body material were dry. After thoroughly mixing the materials, in order to assist the chemicals in dissolving, and to produce a homogeneous mass, the conveying and mixing screws finally deliver the finished product at the end of the machine to a traveling conveyer, which raises the material and either drops it into a car or onto piles.

The last-named conveyer is arranged on the machine in such a manner that it may be swung around through a large arc in order to allow a large quantity of material to be dumped before it is necessary to move the machine.

An attachment is also provided on the machine which regulates the amount of body material supplied to the cutter. This mechanism is set so that when the machine is running at a constant speed the amount of body material that can possibly go through the machine is absolutely constant and unvariable. It also prevents the machine from being overloaded or clogged.

A special feature has been introduced in this machine to prevent it from becoming broken in case foreign bodies like bricks, horseshoes, nails, wire, etc., should accidentally be fed to the cutting mechanism. The device which is intended to prevent damage to the machine consists of a yieldable or frangible clutch or coupling. In a specific embodiment, this may be mounted on the countershaft and form part of the large gear driving the cutter. This coupling engages the large gear by means of movable wooden pegs which are so dimensioned that they will break in case the cutter strikes an object which is too hard to be cut through. This temporarily disconnects the cutter from the rest of the mechanism. By reversing the movement of the feed rollers and feed conveyer table by means of a reversing mechanism which will be referred to later, the object can be removed from the cutting mechanism, and, after inserting new pegs in the clutch, operation can again proceed.

The machine, as described, has distinct advantages over those now in use, it being the only machine which will allow the manufacture and production of properly cut and mixed fertilizer, having the necessary chemically balanced available plant food and the correct degree of moisture.

Where specific mechanisms are mentioned above, it is for the purpose of illustrating devices which may carry out the objects intended and it is not intended to limit the invention to the precise mechanisms named, except so far as is claimed hereinafter.

It will be evident that various specific devices may be used and also that in some embodiments of the invention it is not essential that all of the foregoing functions shall be provided for.

The accompanying drawing shows one specific embodiment of the invention which is the best I have devised up to the present time and this will now be described and its mode of operation sufficiently pointed out in addition to the foregoing general description.

Figure 1 is a top plan of a machine embodying the invention; Fig. 2 is a side elevation of the same; Fig. 3 is an enlarged top plan of the central portion of Fig. 1; Fig. 4 is an enlarged sectional detail of the delivery end of the mixer and the receiving end of the stacker; Fig. 5 is an enlarged vertical section of the central portion of the machine; Fig. 6 is an enlarged top plan of the receiving end of the mixer and adjacent gearing; Fig. 7 is an enlarged detail of changeable gearing for delivering the material from one of the hoppers, and Fig. 8 is an enlarged detail of a part of the tank.

The parts of the machine are connected by a suitable framework, the details of which are not important, and this is carried on wheels 1 for the convenient moving of the machine from place to place. At the receiving end of the machine is a conveyer 2, upon which body material is loaded. In the present embodiment, this conveyer is of belt form supported by pulleys or rollers 3, 4, and further supported by intermediate rollers 5. The conveyer delivers the body material to feed rollers 6 and 7, which preferably have toothed or ribbed peripheries. These rollers revolve in the direction indicated by the arrows. In advance of the feed rollers is a device which may be called for identification a regulator 8, and in the present embodiment this is in the form of a belt supported by rollers 9 and 10. The belt rotates in the direction of the arrow, so that its operative side runs in a direction opposite to the movement of the conveyer 2. The effect of this regulator is to move rearwardly any excess amount of body material supplied by the conveyer, and in this way a uniform feed to the rollers 6 and 7 is maintained even though the conveyer may at times be excessively loaded. The regulator may be adjusted and its regulating effect thus varied. The specific adjusting means here shown consists in the movable supporting roller 10. A supporting bar 11 may be provided with holes 12 in which a pin 13 may be adjustably placed to adjust the position of the end of the regulator adjacent to the feed rollers. A guard or housing 13ª may extend over the regulator, feed rollers and the cutter 14. The regulator may be provided with blades or spikes 15, and to insure the clearing of the regulator stationary blades or spikes 16 carried by housing 13ª may be provided.

Body material is delivered by rollers 6 and 7 to a cutting-bar or knife-bar 17, with which the cutter 14 coöperates to cut up the body material into the desired lengths. The cutter is carried by a shaft 18. The cut material drops into conveyer trough 19, wherein mixing conveyers 20, 21, rotate in opposite directions upon their respective shafts 22 and 23. The discharge end of trough 19 delivers the mixed and completed material to the receiving hopper 24 of elevator or stacker 25. It is of the greatest importance for the economical production of fertilizing material that it shall be cheaply and conveniently disposed of by the machine, and for this purpose, to obtain the best results, a stacker or delivery conveyer is quite essential. The details of this part of the machine will be later described.

Additional ingredients are preferably supplied to the body material near the front or receiving end of the mixing trough 19 and for this purpose a plurality of hoppers 26 are provided, usually having slanting bottoms. These slanting bottoms terminate in vertical throats 27 and the throats communicate with delivery spouts 28 from which the contents of the hoppers is delivered to the mixing trough. The ingredients are placed in the hoppers in approximately dry and in more or less pulverized form, and since the materials may be more or less lumpy or improperly mixed, it is preferable to provide breaking, pulverizing, mixing and positive delivery means for insuring the positive delivery of a definite desired quantity of material from each hopper in proper condition to the body material in the mixer 19. For this purpose, in throat 27 of each hopper is a bladed mixer 29, the blades of which coöperate with fixed blades 30 in the throat. From this breaker and mixer the material drops to a screw conveyer 30ª which positively delivers the material from the spout or nozzle 28. To adjust the delivery rate in relation to the body material, and to maintain this rate definitely for any condition of adjustment, changeable gearing is provided, the details of which are shown in Fig. 7. There is a transverse shaft 31 common to all the hopper delivery devices. This shaft carries bevel gears 32, one for each of the hoppers. For each hopper there is a driving gear shaft 33 carrying a bevel gear 34 engaging the corresponding bevel gear 32. On driving gear shaft 33 are a plurality of gears 34ª of different sizes and these engage driven gears 36 on driven shaft 37 and this shaft is provided with a splineway and tooth or key 38 to engage recesses in the hubs of driven gears which are loosely mounted in respect to the shaft. The key 38 is carried by a rod 39 terminating in a hand wheel 40 and this rod is also provided with notches 41 engaged by a spring-pressed plunger 42 to locate the tooth in engagement with the desired gear. The driven shaft 37 drives, by means of gears 41 and 42, shaft 43 of the pulverizer 29. The ratio of gears 41 and 42 is such that the breaker and mixer 29 supplies material to the delivery conveyer 30ª at least slightly in excess of the delivery capacity of the latter and in this way a certain and definitely-proportioned rate of feed of the fertilizer ingredients is attained. This driving arrangement is also such that the speed ratio between the pulverizer and the delivery conveyer is constant for any of the driving adjustments of this hopper delivery mechanism. An indicating scale 44 (see Fig. 5) may be provided for each of the hoppers, and by moving the hand wheel 40 in relation to this scale, the corresponding hopper delivery means may be readily adjusted, or delivery from the particular hopper may be discontinued by placing the hand wheel in an idle position, so that the delivery means will not be driven.

Any one or more of the hoppers may be used to supply different materials at the same time, and the relative proportion of materials to each other and to the body material may be definitely and easily regulated in a manner that is obvious from the previous description.

Adjacent to the hoppers is a tank 45 to which water or other liquid ingredient may be supplied through a pipe 46 and the level kept constant by means of a float valve and float 47. This liquid is delivered into the mixing trough through pipe 48 and transverse spraying head 49, the supply being regulated or cut off as conditions may require by valve 50.

The stacker has side boards 55 at the sides of the working stretch of the belt, and these are supported by arms 56 pivoted on a transverse shaft 57. This horizontal pivot is in turn carried by a supporting yoke 58 pivoted on a vertical axis 59. In connection with the size and shape of the hopper 24, this arrangement is such that the stacker may be swung around on its vertical axis through a large part of a circle. For convenience in transportation also, the stacker may be swung around on the horizontal pivot 57 to the position shown in dotted lines in Fig. 2, where it lies horizontally above the machine, and this may be done without disconnecting any of the driving parts, as will appear.

In the preferred embodiment, all of the mechanism is driven from shaft 60 carrying driving pulley 61. Suitable sprockets and chains 62 drive the hopper delivery shaft 31. Suitable sprockets and chain 63 leading from shaft 31 drive a horizontal shaft 64. Bevel gear 65 thereon drives bevel gear 66 on sleeve 67 carried by the vertical pivot axis 59 previously mentioned. From this, bevel gears 68 drive a shaft 69, and from this, by means of gears 70, a sleeve 71 carried on the horizontal pivot shaft 57 is driven. The stacker is driven from this sleeve 71 by means of sprockets and chain 72 leading to a transverse shaft 73 carried by the stacker frame. From this, bevel gears 74 drive a longitudinal shaft 75, at the outer end of which gears 76 drive a transverse shaft 77 which supports the outer end of the stacker conveyer. The inner end of this conveyer is supported by an idler shaft 78 located within the hopper 24.

To drive the cutter shaft 18, primary drive shaft 60 carries at the end opposite the pulley 61 a pinion 80, see Fig. 3. This engages gear 81 revolubly mounted in relation to shaft 18. The shaft also carries a flange 82 and this flange and the web of gear 81 are correspondingly perforated, and in these perforations are placed one or more wooden pegs 83. In this way a frangible driving connection for the cutter-shaft is provided, so that if foreign objects get into the body material and are encountered by the cutter, the driving connection may be ruptured and injury to the cutter avoided, and at the same time the driving connection may be easily restored after the obstacle is removed by inserting another plug. This particular device is only representative of many different forms of frangible or yieldable driving connections that may be employed for the cutter.

From primary shaft 60 suitable sprockets and a chain 84 drive a transverse shaft 85 (see Figs. 1, 5 and 6). Keyed to this shaft are bevel gears 86 and 87, which engage bevel gears 88 on the rear ends of conveyer-shafts 22, 23 and so revolve the conveyer shafts in opposite directions. Also keyed to shaft 85 is a pinion 89 and a sleeve 90 is revolubly mounted on shaft 85. This sleeve carries a pinion 91 and a bevel gear 92 engaging the bevel gear 88 of one of the conveyer shafts. Pinion 89 engages a gear 93 revolubly mounted on a shaft 94 and pinion 91 engages a gear 95 revolubly mounted on shaft 94. A sliding clutch sleeve 96 splined on the countershaft 94 is provided with clutch teeth to engage teeth provided on gears 93 and 95 and this clutch sleeve is shifted by rod 97 and lever 98 conveniently placed at one side of the machine. The countershaft carries a sprocket 99 and from this a chain 100 drives the shaft of feed roller 7 and from this shaft, in turn, a chain 101 drives the shaft of feed belt pulley 4. When the clutch 96 is in the position shown, the feed rollers and feed belt will be driven in a forward direction, but when for different reasons it may be desired to reverse the direction of movement of the feed belt, this may be done by moving clutch 96 to engage gear 95, and thereupon the countershaft will be driven through bevel gears 87, 88 and 92, pinion 91 and gear 95 in a reverse direction and the feed belt correspondingly moved in a reverse direction. The upper feed roller 6 may be suitably connected with the lower feed roller by chains and sprockets or other gearing 102 and the bearings of the shaft of this roller may be adjustably mounted in slots 103 to permit feed roller 6, by its weight, to bear upon the body material to positively feed it to the cutter. Additional pressure means may be applied to the roller shaft if necessary or desirable.

The regulator 8 is driven from shaft 85 by means of sprockets and a chain 104.

While the above described embodiment is a preferred form, the principles of the invention may be embodied in many different forms and it should be further understood that all of the described features need not be used together, but in different cases some or all of the different instrumentalities described or their equivalents may be used together to perform such of the important functions above described as are necessary in specific uses of the invention.

I claim:—

1. In a fertilizer mixing machine or the like, the combination of a cutter, serrated feed rollers in advance of the cutter arranged to deliver body material directly to the cutter, a conveyer for delivering body material to the feed rolls, and conveying means for moving material from the cutter.

2. In a fertilizer mixing machine or the like, the combination of a cutter, means for feeding body material thereto, and means for regulating the delivery of body material to the cutter.

3. In a fertilizer mixing machine or the like, the combination of a cutter, feed rolls therefor, a feed conveyer and a feed regulator moving substantially opposite to the movement of the conveyer for regulating the feed.

4. In a fertilizer mixing machine or the like, the combination of a cutter, feed rolls therefor, a feed conveyer and a feed regulator moving substantially opposite to the movement of the conveyer for regulating the feed, and a mixing conveyer for mixing and removing the material from the cutter.

5. In a fertilizer mixing machine or the like, the combination of a cutter, means for feeding body material thereto, a mixing conveyer receiving material from the cutter, a container for a solid fertilizer ingredient, and adjustable means for delivering said ingredient from the container to the mixer adjacent to the cutter.

6. In a fertilizer mixing machine or the like, the combination of a cutter, means for feeding body material thereto, a conveyer trough receiving material from the cutter, a mixing conveyer in the trough, a hopper for a solid fertilizer ingredient, and positively operated delivery means for delivering said ingredient to the mixer adjacent to the cutter and means for adjusting the rate of delivery from said hopper in relation to the rate of feed of the body material.

7. In a fertilizer mixing machine or the like, the combination of a cutter, means for feeding body material thereto, a conveyer trough receiving material from the cutter, a mixing conveyer in the trough, a hopper for a solid fertilizer ingredient, and positively operated delivery means for delivering said ingredient in definite and predetermined proportion to the body material to the mixer adjacent to the cutter and means for adjusting the rate of delivery from said hopper in relation to the rate of the feed of the body material.

8. In a fertilizer mixing machine or the like, the combination of a cutter, means for feeding body material thereto, a mixer receiving material from the cutter, a plurality of containers for fertilizer ingredients, and means for positively delivering material from said hoppers to the mixer in definite and predetermined ratio to the body material.

9. In a fertilizer mixing machine or the like, the combination of a cutter, means for feeding body material thereto, a mixer receiving material from the cutter, a plurality of containers for fertilizer ingredients, means for positively delivering material from said hopper to the mixer in definite and predetermined ratio to the body material, and means for independently regulating the delivery rate of said ingredients.

10. In a fertilizer mixing machine or the like, the combination of a cutter, feed rolls therefor, a feed conveyer, a regulator to control the amount of material supplied by the conveyer to the feed rolls, a mixing conveyer posterior to the cutter, one or more hoppers for fertilizing ingredients, and positively adjustable delivery means for delivering the material from said hoppers to the mixer.

11. In a fertilizer mixing machine or the like, the combination of a cutter, feed rolls therefor, a feed conveyer, a regulator to control the amount of material supplied by the conveyer to the feed rolls, a mixing conveyer posterior to the cutter, one or more hoppers for fertilizing ingredients, positively adjustable delivery means for delivering the material from said hoppers to the mixer, a primary driving member and connections therefrom to said cutter, feed rolls and conveyer and hopper delivery means.

12. In a fertilizer mixing machine or the like, the combination of a cutter, feeding means therefor, a mixer posterior to the cutter, one or more hoppers for fertilizer materials, positive delivery means for each of said hoppers, a primary driving member, a driving connection between said primary member and said cutter and said feeding means, and variable speed driving connections between the primary member and said hopper delivery mechanism.

13. In a fertilizer mixing machine or the like, the combination of a cutter, feeding means therefor, a mixer posterior to the cutter, means for adding additional fertilizer ingredients, a fluid tank and adjustable means for delivering fluid from said tank to the mixer.

14. In a fertilizer mixing machine or the like, the combination of a cutter, feed means therefor, a mixer posterior to the cutter, means for adding fertilizing ingredients and liquid as desired, a driving member and a safety driving connection between said driving member and said cutter.

15. In a fertilizer mixing machine or the like, the combination of a cutter, feed means therefor, a mixer posterior to the cutter, means for adding fertilizing ingredients and liquid as desired, a driving member, and a frangible driving connection between said driving member and said cutter.

16. In a fertilizer mixing machine or the like, the combination of a cutter, means for feeding a definite amount of body material thereto, a mixer posterior to the cutter, one or more hoppers for fertilizer or other materials, positive delivery means for each of said hoppers, a primary driving member, a driving connection between said primary member and said cutter and said feeding means, and means for varying the amounts of said fertilizer or other materials delivered by said hopper delivery mechanism into the body material.

17. In a fertilizer mixing machine or the like, the combination of a cutter, a conveyer for body material, positive means for feeding base material from the conveyer to the cutter, a mixer receiving material from the cutter, a plurality of containers for fertilizer ingredients, and means for positively delivering material from said containers to the mixer in definite and predetermined ratio to the body material.

18. In a fertilizer mixing machine or the like, the combination of a cutter, means for feeding body material thereto, a feed regulator, a mixer receiving material from the cutter, a plurality of containers for fertilizer ingredients, means for positively delivering material from said containers to the mixer in definite and predetermined ratio to the body material, and means for independently regulating the delivery rate of said ingredients.

19. In a fertilizer mixing machine or the like, the combination of a cutter, a feed conveyer, feed rolls between the conveyer and the cutter, a mixer posterior to the cutter, means for adding additional fertilizer ingredients, a fluid tank and adjustable means for delivering fluid from said tank to the mixer.

20. In a fertilizer mixing machine or the like, the combination of a cutter, positive feed means therefor, a mixer posterior to the cutter, means for adding fertilizer ingredients and liquid as desired, a driving member and a safety driving connection between said driving member and said cutter.

21. In a machine for mixing fertilizer and the like, the combination of a mixer, means for feeding body material thereto, a container for additional solid fertilizing material, delivery means therefor, means for operating said delivery means, and means for adjusting the rate of delivery of said additional material in relation to the speed of said first-named feeding means.

22. In a machine for mixing fertilizer and the like, the combination of a mixer, means for feeding body material thereto, a plurality of containers for additional material, positive delivery means for each container to deliver material therefrom to the mixer, and means for independently adjusting the delivery means of the different containers in relation to the feed ratio.

23. In a machine for mixing fertilizer and the like, the combination of a mixer, means for feeding body material thereto, a hopper for additional material, a helical delivering device for delivering material therefrom to the mixer, means for driving the said feeding means and changeable gearing intermediate said driving means and said delivery devices to drive the latter positively in relation to the feeding means and at variable speeds.

24. In a machine for mixing fertilizer and the like, the combination of a mixing conveyer, means for feeding body material thereto, a hopper for additional material, a delivery spout therefor, a stirring device therein, a helical delivery device, driving means for the feeding means first-mentioned, and gearing intermediate said driving means and said stirrer and delivery device for positively driving the latter at a determined ratio to the speed of said feeding means.

25. In a machine for mixing fertilizer and the like, the combination of a mixing conveyer, means for feeding body material thereto, a hopper for additional material, a delivery spout therefor, a stirring device therein, a helical delivery device, driving means for the feeding means first-mentioned, and changeable gearing intermediate said driving means and said stirrer and delivery device for positively driving the latter at a determined ratio to the speed of said feeding means.

26. In a machine for mixing fertilizer and the like, the combination of a mixing conveyer, feeding means therefor, a plurality of hoppers for additional fertilizing material, a stirring and positive delivery device for each hopper to deliver material therefrom to the mixer, guiding means for the feeding means, and gearing intermediate said driving means and each of said stirring and delivery means to positively drive the latter at a definite ratio to the speed of the feeding means.

27. In a machine for mixing fertilizer and the like, the combination of a mixing conveyer, feeding means therefor, a plurality of hoppers for additional fertilizing material, a stirring and positive delivery device for each hopper to deliver material therefrom to the mixer, guiding means for the feeding means, and changeable gearing intermediate said driving means and each of said stirring and delivery means to positively drive the latter at a definite ratio to the speed of the feeding means.

FRITZ P. MANSBENDEL.

Witnesses:
E. M. Bowers,
Wm. F. Gebhardt.